(No Model.) 2 Sheets—Sheet 1.

J. H. WILTS.
COMBINED LAND ROLLER, PULVERIZER, AND HARROW.

No. 478,490. Patented July 5, 1892.

Witnesses:
W. J. Sankey
R. H. Orwig

Inventor: Jibbo H. Wilts,
By Thomas G. Orwig, Att'y.

(No Model.) 2 Sheets—Sheet 2.
J. H. WILTS.
COMBINED LAND ROLLER, PULVERIZER, AND HARROW.
No. 478,490. Patented July 5, 1892.
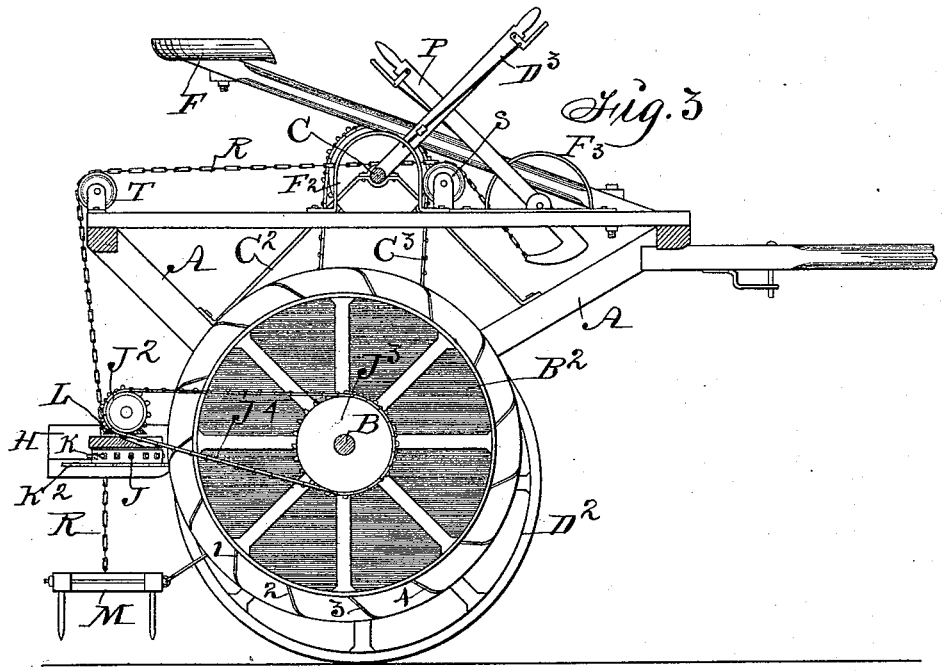
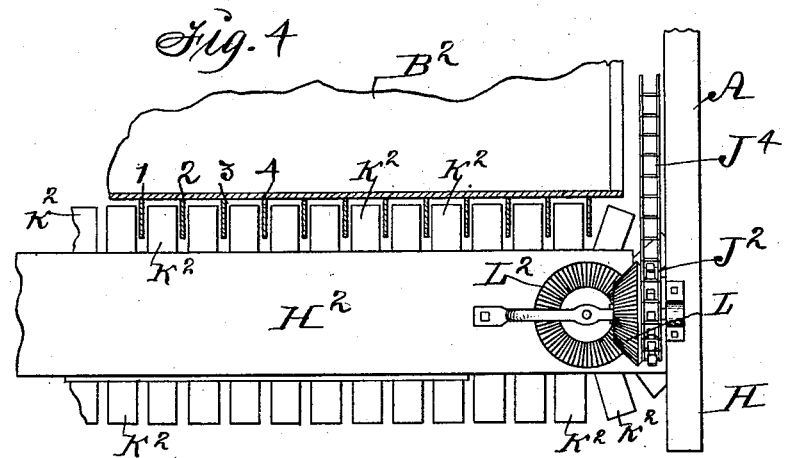
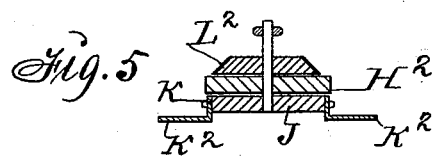
Witnesses: W. J. Sankey, R. H. Orwig
Inventor: Jibbo H. Wilts, By Thomas G. Orwig, Atty.

UNITED STATES PATENT OFFICE.

JIBBO H. WILTS, OF ACKLEY, IOWA.

COMBINED LAND-ROLLER, PULVERIZER, AND HARROW.

SPECIFICATION forming part of Letters Patent No. 478,490, dated July 5, 1892.

Application filed March 27, 1891. Serial No. 386,696. (No model.)

*To all whom it may concern:*

Be it known that I, JIBBO H. WILTS, a citizen of the United States of America, and a resident of Ackley, in the county of Hardin and State of Iowa, have invented a Land-Roller, Pulverizer, and Harrow Combined, of which the following is a specification.

My object is to facilitate the preparation of a field for the reception of seed by providing a machine that will crush, cut, and pulverize the plowed ground, and also stir and furrow the fine loose soil on the surface and gather rubbish as the machine is advanced by means of horses.

My invention consists in the construction and combination of a roller having spiral cutters, mechanism for cleaning the cutters, mechanism for making the roller and cutters inoperative, a harrow, and mechanism for making it inoperative with a carriage, as hereinafter set forth, pointed out in my claims, and illustrated in the accompanying drawings, in which—

Figure 1:
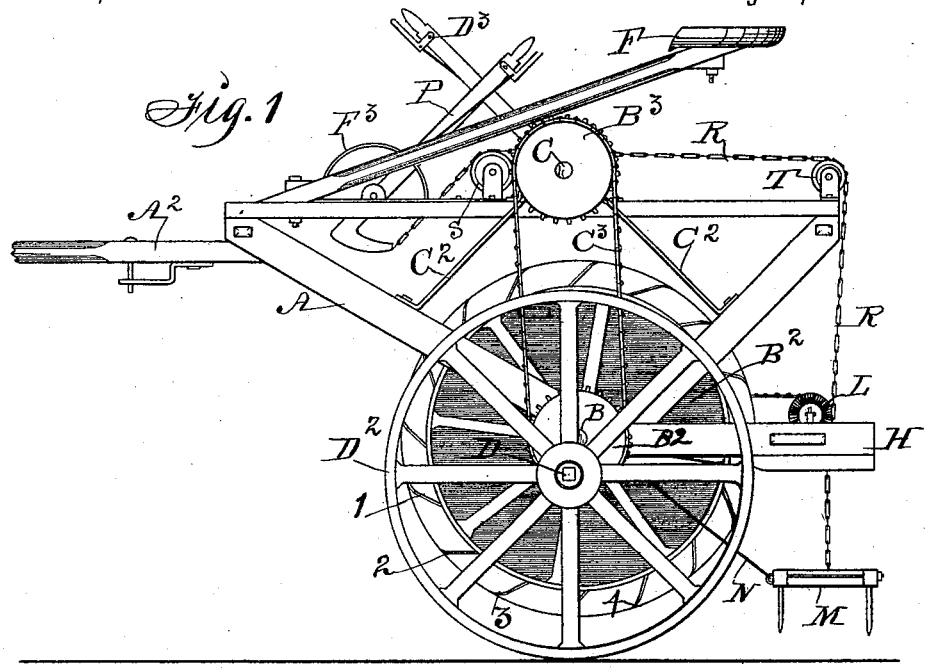
Figure 2:
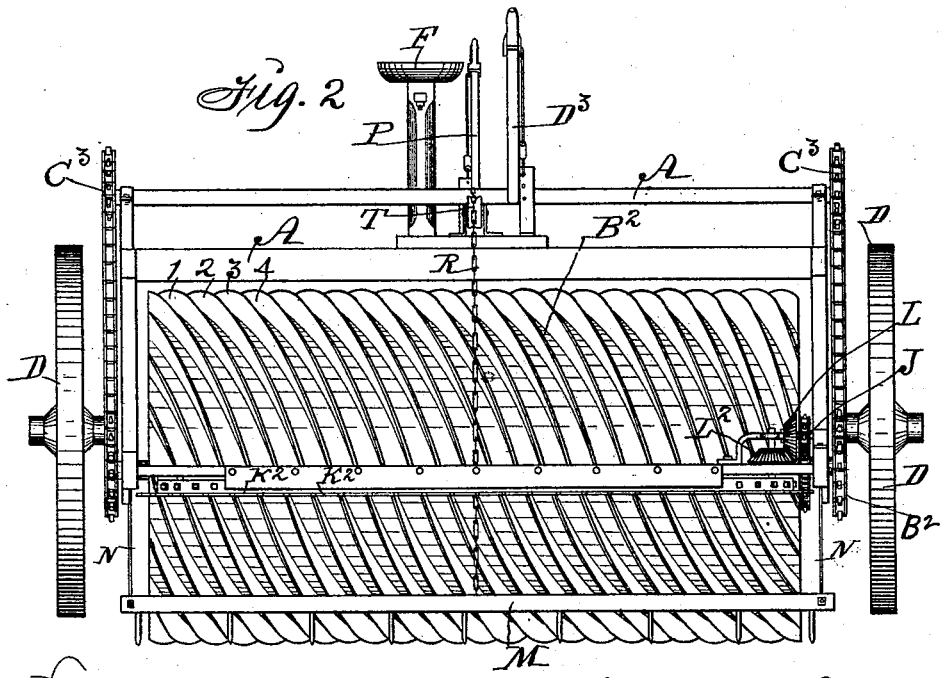

Figure 1 is a side view showing the roller, cutters, and harrow elevated, as required to be carried inoperative. Fig. 2 is a rear view showing the roller, cutters, and harrow lowered, as required to operate. Fig. 3 is a vertical section of the machine. Fig. 4 is an enlarged detail view showing the construction and combination of the cutter-cleaning mechanism, with the roller and carriage. Fig. 5 is a detail view of the cutter-cleaning scrapers.

A represents a carriage-frame adapted to support and carry the operative devices.

$A^2$ is a pole at its front and center for connecting horses thereto, as required to advance and direct the movements of the machine.

B is the axle of a land-roller $B^2$ in bearings fixed to the ends of the carriage-frame A.

$B^3$ are sprocket-wheels on the ends of the axle and outside of the ends of the frame A.

$B^4$ are corresponding sprocket-wheels on the ends of a rock-shaft C, that is supported upon bearers $C^2$, fixed to the ends of the frame A.

$C^3$ are chains that connect the wheels $B^2$ and $B^3$.

D are stub-axles fixed to the wheels $B^2$, and $D^2$ are traction-wheels on the axles D.

$D^3$ is a hand-lever fixed to the central portion of the shaft C to extend upward within reach of a driver's seat F, mounted upon the top of the frame A.

$F^2$ is a rack fixed to the frame A to engage a latch carried by the lever, as required to retain the shaft C in a fixed position and the roller elevated and inoperative whenever desired. By pulling the lever $D^3$ forward the rock-shaft C and the wheels $B^3$ and $B^4$ are actuated, as required to lower the traction-wheels $D^2$ and to thereby elevate the roller $B^2$, as shown in Figs. 1 and 3. A reverse motion of the lever $D^3$ elevates the wheels $D^2$ and lowers the roller, as required to engage the surface of the ground over which it is to be operated.

Nos. 1 2 3 4 represent a series of cutters fixed to the periphery of the roller to extend spirally relative to the length of the roller and radially from the surface of the roller.

H are rearward extensions of the ends of the frame A, and $H^2$ is a cross-piece fixed thereto to support the cutter-cleaning mechanism.

J are sprocket-wheels on the under side and ends of the cross-piece $H^2$, and K is an endless chain that has horizontal projections $K^2$, that extend between the cutters on the surface of the roller and, as the roller rotates, scrape the spaces between the cutters, as required to free them from any ground or matter that may lodge in the spaces.

$J^2$ is a sprocket-wheel in a bearing fixed to the frame A and connected with a sprocket-wheel $J^3$, fixed to the axle B of the roller $B^2$ by means of a chain $J^4$.

L is a bevel-gear on the inner end of the axle of the wheel $J^2$ and meshes with a corresponding wheel $L^2$ on the axle of the wheel J in such a manner that rotary motion is transmitted from the roller $B^2$ to the wheel J, as required to actuate the endless chain of scrapers $K^2$ in concert with the roller.

M is a harrow connected with the ends of the frame A, by means of rods or long links N, in such a manner that the harrow will normally rest upon the ground to be dragged after the roller. The endless chain K, that extends over the horizontally-rotating sprocket-wheels J, is thus kept in motion in concert with the roller $B^2$, and the projections $K^2$, that extend horizontally from the chain, will successively enter the spiral grooves or spaces between the spiral cutters on the roller at one end of the roller and come out at the other end of the roller, and by thus traversing the spaces they will scrape and remove matter from between the spiral cutters, as required to prevent the roller from becoming clogged and the cutters inoperative.

P is a hand-lever pivoted to the top of the frame to project upward within reach of the operator on the seat F. Its lower curved end is connected with the harrow by means of a chain R, that extends over directing-pulleys S and T, attached to the frame, as shown in Figs. 1 and 3, in such a manner that the harrow can be readily raised and lowered by means of the lever and chain.

$F^3$ is a rack fixed to the frame A to engage the latch carried by the lever P, as required to lock the lever and to retain the harrow elevated and inoperative.

From the foregoing description of the construction and function of each element and sub-combination the unitary action of all the operative parts and the practical operation and utility of the complete invention will be readily understood by farmers and persons familiar with land-rollers and harrows.

I claim as my invention—

1. A land-roller having sprocket-wheels on the ends of its axle, stub-axles on the sprocket-wheels, traction-wheels on the stub-axles, a rock-shaft having sprocket-wheels on its ends and connected with the sprocket-wheels on the axle of the roller by means of chains, and means for operating the rock-shaft, arranged and combined with a carriage for raising and lowering the roller, for the purposes stated.

2. The combination of an endless chain having scrapers projecting outward and adapted in shape and size to enter spaces between spiral cutters on the surface of the land-roller, and mechanism for actuating the chain and scrapers in concert with the land-roller, in combination with a land-roller and a carriage, to operate in the manner set forth, for the purposes stated.

3. A machine for rolling, pulverizing, and harrowing land, comprising a roller mounted on the axle of a carriage-frame and provided with spiral cutters on its periphery, sprocket-wheels journaled to the carriage-frame in line with the axis of the roller and provided with stub-axles, traction-wheels on the stub-axles, a rock-shaft in bearings fixed to the carriage-frame, sprocket-wheels on the ends of the rock-shaft, connected with the sprocket-wheels that carry the stub-axles by means of chains, means for actuating and locking the rock-shaft to the carriage-frame, an endless chain carrying scrapers for cleaning the spiral cutters on the roller, means for automatically actuating the chain and scrapers, a harrow, and means for raising and lowering it in rear of the roller, arranged and combined to operate in the manner set forth.

JIBBO H. WILTS.

Witnesses:
UBBE JOHNSON,
JACOB B. SMITH.